(12) United States Patent
Loibl et al.

(10) Patent No.: US 9,497,988 B2
(45) Date of Patent: Nov. 22, 2016

(54) RAPID FLUID COOLING SYSTEM AND METHOD FOR HOT BULK LIQUIDS AND CONTAINER THEREFOR

(75) Inventors: Gregory H. Loibl, Hyde Park, NY (US); George Sidebotham, Babylon, NY (US); Michael B. Gutierrez, Roselle, NJ (US)

(73) Assignee: The Cooper Union, New York, NY (US)

( * ) Notice: Subject to any disclaimer, the term of this patent is extended or adjusted under 35 U.S.C. 154(b) by 1440 days.

(21) Appl. No.: 12/044,260

(22) Filed: Mar. 7, 2008

(65) Prior Publication Data

US 2008/0216489 A1 Sep. 11, 2008

Related U.S. Application Data

(60) Provisional application No. 60/905,552, filed on Mar. 7, 2007.

(51) Int. Cl.
*A23L 3/36* (2006.01)

(52) U.S. Cl.
CPC ...................... *A23L 3/364* (2013.01)

(58) Field of Classification Search
CPC ....................................... A23L 3/364
USPC ......... 62/121, 304, 315, 316, 373, 378, 381, 62/457, 430, 530, 63–64; 220/256, 608, 220/66, 251; 222/105, 143, 555, 222/196.1–196.5, 98, 566–568; 206/503, 206/112–131, 216–218, 394–397, 430–431, 206/508–509, 541–549, 550, 595; 117/202–206; 376/272; 118/318; 141/331–333, 337–339; 426/412; 81/3.3
See application file for complete search history.

(56) References Cited

U.S. PATENT DOCUMENTS 2,326,414 A * 8/1943 Thompson ................... 220/4.27
2,655,007 A   10/1953 Lazar
(Continued)

FOREIGN PATENT DOCUMENTS

DE    19910181     9/2000
EP      278884     8/1988
(Continued)

OTHER PUBLICATIONS

International Search Report and Written Opinion for PCT/US2010/034994, Jul. 30, 2010.
(Continued)

*Primary Examiner* — Emmanuel Duke
(74) *Attorney, Agent, or Firm* — Kane Kessler, P.C.; Barry E. Negrin

(57) ABSTRACT

A system of rapidly cooling hot bulk liquids includes a chilling station having a reservoir for holding a cooling medium. The reservoir includes an outlet for removing excess of the cooling medium. A container bay disposed substantially above the reservoir is adapted to receive at least one container of hot bulk liquid to be cooled. At least one rotator is adapted to rotate the container placed in the container bay substantially around the container's longitudinal axis. A spray jet outlet is disposed substantially above the container bay and in fluid communication with the reservoir. The spray jet outlet is adapted to spray the container with the cooling medium while the roller is rotating the container. The container includes a void volume, preferably at least 5%. The rotator rotates the container at a rate that depends on the size of the container and/or the viscosity of the contents of the container.

40 Claims, 21 Drawing Sheets

(56) References Cited

U.S. PATENT DOCUMENTS

| | | | |
|---|---|---|---|
| 2,744,655 A * | 5/1956 | Vnuk | 220/62.22 |
| 2,794,326 A | 6/1957 | Mencacci | |
| 3,083,547 A | 4/1963 | Stevens et al. | |
| 3,283,523 A * | 11/1966 | Long | A23L 3/02 134/131 |
| 3,316,734 A | 5/1967 | Crane, Jr. | |
| 4,139,992 A | 2/1979 | Fraser | |
| 4,164,851 A | 8/1979 | Bryant | |
| 4,207,006 A * | 6/1980 | Wilson | 366/220 |
| 4,304,105 A * | 12/1981 | West | A23L 3/04 104/70 |
| 4,531,382 A | 7/1985 | Butler et al. | |
| 4,549,409 A | 10/1985 | Smith | |
| 4,580,405 A | 4/1986 | Cretzmeyer, III | |
| 4,628,703 A | 12/1986 | Kim | |
| 4,711,099 A | 12/1987 | Polan et al. | |
| 4,722,198 A | 2/1988 | Huang | |
| 4,736,593 A | 4/1988 | Williams | |
| 4,803,850 A | 2/1989 | Josten et al. | |
| 4,813,243 A | 3/1989 | Woods et al. | |
| 4,825,665 A | 5/1989 | Micallef | |
| 5,282,368 A | 2/1994 | Ordoukhanian | |
| 5,505,054 A * | 4/1996 | Loibl | A23L 2/42 62/375 |
| 5,653,123 A | 8/1997 | Handlin | |
| 6,015,062 A * | 1/2000 | Bachmann et al. | 220/295 |
| 6,722,517 B1 * | 4/2004 | Steeber et al. | 220/251 |
| 2002/0125249 A1 * | 9/2002 | Baird-Smith | B65D 43/0231 220/258.1 |
| 2004/0112069 A1 * | 6/2004 | Loibl | F25B 21/04 62/64 |
| 2004/0178200 A1 * | 9/2004 | Langlois et al. | 220/230 |
| 2005/0194342 A1 | 9/2005 | Nhan et al. | |
| 2005/0257646 A1 * | 11/2005 | Yeager | 81/3.33 |
| 2005/0279106 A1 * | 12/2005 | Leonzo et al. | 62/4 |
| 2006/0021995 A1 * | 2/2006 | Lavin et al. | 222/105 |
| 2006/0185372 A1 * | 8/2006 | Conde Hinojosa | A23L 3/36 62/64 |
| 2008/0196447 A1 | 8/2008 | Hempell | |

FOREIGN PATENT DOCUMENTS

| | | | | |
|---|---|---|---|---|
| FR | 2734306 | * | 11/1996 | E05D 7/00 |
| FR | 2734306 A1 * | | 11/1996 | E05D 7/04 |
| GB | 1537821 | | 1/1979 | |
| JP | 2005-331159 | | 12/2005 | |
| WO | 97/35155 | | 9/1997 | |
| WO | 2006/061612 | | 6/2006 | |

OTHER PUBLICATIONS

International Search Report for PCT/US2008/003957.

* cited by examiner

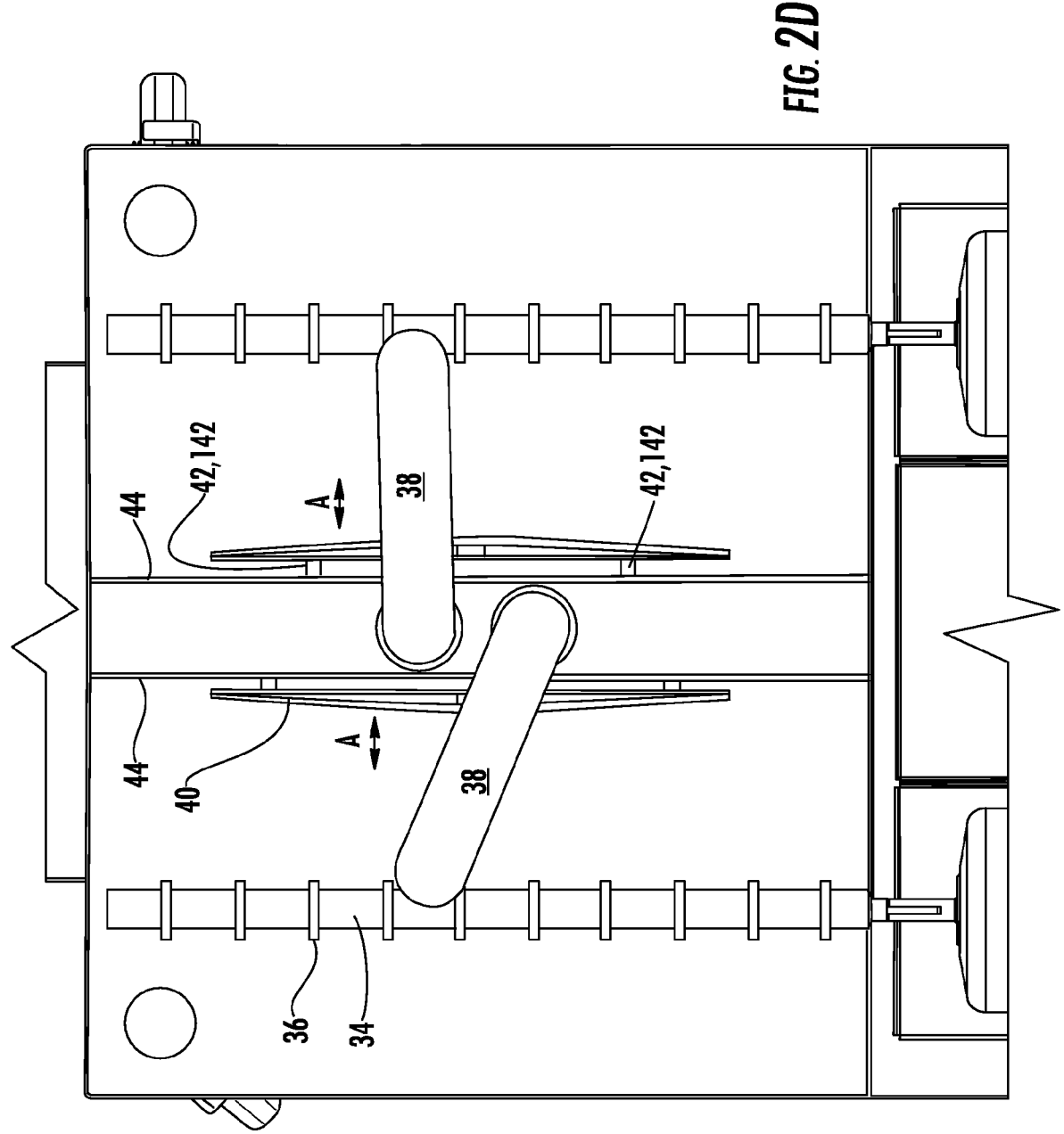

RAPID FLUID COOLING SYSTEM AND METHOD FOR HOT BULK LIQUIDS AND CONTAINER THEREFOR

RELATED APPLICATIONS

Domestic priority is claimed from U.S. Provisional Patent Application No. 60/905,552 to Loibl et al., entitled "Rapid Fluid Cooling Apparatus for Hot Bulk Liquids and Container Therefor", filed Mar. 7, 2007, the entirety of which is incorporated by reference herein.

BACKGROUND OF THE INVENTION

1. Field of the Invention

This invention relates to devices for use in the rapid cooling of fluids in various containers, and more particularly to such devices suitable for cooling large quantities of extremely hot liquids such as soups, stocks, sauces, and the like, especially in a commercial kitchen.

2. Description of the Related Art

In the food preparation industry, kitchens create stock to be used in gravy, soups, and other foods served along with meals. The stock is made by cooking meat, bones, fat in water to a temperature of 190° Fahrenheit to both pasteurize and allow the heated water to absorb the fat. It is currently common practice to create between 1 and 100 gallons of stock and let it sit in an open pot. The pot is usually stored in either a kitchen sink or a refrigerator/freezer. Often, as the stock is cooling off, airborne contaminants may enter the stock creating a safety and health hazard in the kitchen and ultimately to the consumer. Bacteria also grows extremely rapidly in the temperature range between 140° and 41° F., often doubling every 20 minutes in this temperature range. The stock often takes between 1 to 7 hours to chill depending on the quantity and method of chilling.

There are several conventional methods of chilling stock. A common method is simply to place the stock into a refrigerator. Given that it takes two hours to chill 12 oz. of liquid in this manner, chilling a commercial quantity of stock in this manner requires an extremely long time (several hours, depending on the quantity to be chilled) to bring the stock down to a safe temperature of 40° F., and it often puts considerable strain on the refrigerator, raises the temperature of the refrigerator, and thus threatens the safety of all the food stored therein. Refrigerators are ill-served for this practice because they are not designed to chill hot food quickly (they are simply designed to keep cold food cold). Even food that is chilled in ambient air to room temperature (~70° F.) and then placed in a refrigerator will still require a lot more chilling time to get to 40° F. The process may be accelerated by chilling the food in an ice water bath and then placing it into a refrigerator, however this will still take at least two hours and require a very large ice water bath to accommodate large quantities of food.

One conventional method that is slightly better than those mentioned above is to pour the stock/food into one gallon bags, place the bags into a cold water bath for at least an hour, and then place the bags into a refrigerator. Even so, there are drawback to this method, as it still takes too long and results in many individual units of stock/food that cannot be stored in a space-efficient manner (owing to the lack of a discrete shape to the bag). Also, the cold water bath temperature rises precipitously and the compressor is not strong enough to keep up with the rising temperature. As such, it is frequently necessary to add ice to the cold water bath.

Another conventional way to hasten the cooling of such liquids is the use of a cold paddle or ice paddle such as that described in U.S. Pat. No. 5,058,396 to Faiola. Typically, a plastic wand or paddle having one or more projections is filled with a cooling medium such as water, cooled or frozen in a refrigerator or freezer, and inserted into and stirred within the hot stock/food to hasten the cooling of the stock/food. There are many problems with such a device. First, the paddle must be inserted and stirred manually, which requires great effort on the part of the stirrer. Also, the stirrer must be positioned substantially right over or in front of the open vat of stock, which is an excellent way of communicating bacteria from the stirrer to the food. Additionally, the paddle is made of a lightweight material such as plastic to make it easy to handle, however plastic is not an exceptionally efficient transmitter of heat (i.e., it has good insulative properties). The paddle itself may also be contaminated with bacteria or traces of other foods into which it had previously been dipped, thereby directly introducing bacteria, allergens, or other undesirable foreign agents into the food.

Other conventional methods include using a device called a "blast chiller", which is essentially a very powerful refrigerator. Typical blast chillers are manufactured by the Traulsen company of Fort Worth, Tex. However, a typical blast chiller will still take 90 minutes to cool 24 gallons of food from 135° F. to 40° F. Such a device would require about 2½ hours to cool 24 gallons of food from 190° F. to 40° F. and does not really benefit the commercial kitchen that generates up to 100 gallons of food at a time.

Another existing device is called a tumble chiller which resembles an extremely large washing machine. It consists of a 4-5 foot diameter rotating drum disposed within an even larger water bath, and it accepts 4-8 quart bags of food. The food bags are sloshed around in the drum until cool. Typical tumble chillers are manufactured by the Cleveland Range company of Cleveland, Ohio. There are several disadvantages to the tumble chiller. First, it occupies an enormous amount of space. Second, it requires a large number of very small bags of material to be cooled. Third, because the bags flop around within the rotating drum, there is a significant chance of breakage. Additionally, when the bags are removed, because they have no discernible shape, they are difficult to stack and store.

Devices exist to chill beverages from room temperature to about 40° F., such as those described in described in U.S. Pat. No. 4,580,405 to Cretemeyer, III (which works poorly) and U.S. Pat. No. 5,505,054 to Loibl et al. (which works exceptionally quickly and efficiently), the teachings of which are incorporated by reference herein. Yet the prior Loibl device, while extremely effective for beverages at room temperature is incapable of cooling extremely large quantities of extremely hot liquids. Also, the Loibl device typically depends on the beverage coming in its own container, be it a 12 oz. aluminum can, a 16-20 oz. glass or plastic bottle, or the like.

Accordingly, there is a long-felt need to provide a system and device for rapidly cooling and subsequent storing of large quantities of extremely hot liquids such as commercially prepared stocks, soups, sauces, gravies, and the like.

SUMMARY OF THE INVENTION

The invention includes a method and system for rapidly cooling hot bulk liquids such as stock, soup, sauces, or gravies.

In one embodiment, the invention includes a method of rapidly cooling hot bulk liquids, comprising the steps of placing a hot bulk liquid in a sealable container having an inherent void volume, preferably of at least 5%, placing the container in a substantially horizontal orientation, rotating the container substantially about its longitudinal axis, and spraying the surface of the container with a cooling medium while the container is rotating. Preferably, the speed of rotation of the container is varied depending on the viscosity of the hot bulk liquid to be cooled; in this case, the greater the viscosity of the hot bulk liquid to be cooled, the slower the rotation rate of the container during the rotating step. The rotating and spraying steps are preferably performed until the hot bulk liquid is cooled to approximately 5° C. In addition or in the alternative, the rotating and spraying steps are performed until a partial vacuum is created within the container. The flow rate of the cooling medium being sprayed is preferably at least approximately 50 LPM.

A reservoir is preferably provided for the cooling medium, wherein the temperature of the cooling medium at least in the reservoir is approximately 0° C. The container is preferably passively positioned with respect to a spray jet outlet for the cooling medium by rotating the container against a curved positioning wall. Preferably, the curved positioning wall is convex.

In another embodiment, the invention includes a method of rapidly cooling hot bulk liquids, comprising the steps of placing a hot bulk liquid in a sealable container, placing the container in a substantially horizontal orientation, rotating the container substantially about its longitudinal axis, and spraying the surface of the container with a cooling medium while the container is rotating. The rotating step further includes varying the speed of rotation of the container depending on the viscosity of the hot bulk liquid to be cooled; the greater the viscosity of the hot bulk liquid to be cooled, the slower the rotation rate of the container during the rotating step.

The invention also includes a container for rapidly cooling hot bulk liquids by way of rotating the container about its longitudinal axis and spraying the container with a cooling medium. The container includes a housing that is preferably substantially cylindrical and a top sealingly attachable to the housing. The top includes an inherent void volume, preferably a void volume of at least 5% of the volume of the housing. Attachment means are provided for sealingly attaching the top to the housing; a first mating portion of the attachment means is disposed on the housing, and a second mating portion of the attachment means is disposed on the top. When the top is attached to the housing, the void volume of the top traps air inside the container even if the housing is completely filled prior to attachment of the top.

In one embodiment of the inventive container, the first mating portion includes a first set of threads disposed on the housing and the second mating portion comprises a second set of threads disposed on the top. Alternatively, the attachment means may include at least one of i) a bayonet fitting between the top and the housing; or ii) clips disposed on an exterior of the container (e.g., such as are found on a mason jar).

Regardless of how the container is sealed, the inventive container may preferably include a projection disposed on an upper surface of the top. The projection facilitates tightening of the top onto the housing. The container may, in addition or the alternative, include a recess formed on an underside of the housing. The recess is adapted to fit atop a raised portion of a container tightening station to substantially prevent the housing from moving when a user tightens the top on the housing. The container recess on the bottom of the housing is preferably substantially the inverse of the container projection on the top of the container, so that multiple containers can thus be stacked with enhanced stability. The container may also include a liner disposed within the housing.

The invention also includes a system of rapidly cooling hot bulk liquids. The inventive system includes a chilling station, which has a reservoir for holding a cooling medium. The reservoir includes a reservoir outlet for removing excess of the cooling medium. A container bay is disposed substantially above the reservoir in the chilling station which is adapted to receive at least one container of hot bulk liquid to be cooled. At least one rotator is adapted to rotate a container placed in the container bay substantially around the container's longitudinal axis. A spray jet outlet, disposed substantially above the container bay and in fluid communication with the reservoir, is adapted to spray the container with the cooling medium while the rotator is rotating the container.

Preferably, the reservoir of the chilling station further includes an inlet for adding additional cooling medium. The reservoir outlet may also include a drain and a valve; when the valve is opened, the cooling medium exits the reservoir via the drain. The reservoir may also include a spillway in fluid communication with the reservoir; when the level of the cooling medium reaches the level of the spillway, excess of the cooling medium exits the reservoir via the spillway. The cooling medium preferably includes ice water; in such case, the inlet includes an ice chute.

The container rotator of the inventive chilling station may take one of several forms. In one embodiment, the rotator includes a roller with which the container is substantially placed in contact. In another embodiment, the rotator includes at least one of a rotator block or rotator recess dimensioned to mate with a corresponding container recess or container projection formed on the container. The block and/or recess rotator may include means for moving the block toward and away from the rotator recess so as to secure the container disposed therebetween. As another alternative, the rotator may include a lathe chuck for securing the container during rotation.

The inventive system may further include a container tightening station having a projection matingly engageable with the recess on the container adapted to substantially prevent the container housing from moving when a user tightens the container top on the container housing when the container recess is fitted over the container tightening station projection.

The inventive chilling station may include a rotation controller in communication with the rotator adapted to control the rate of rotation of the rotator and thus the container. The rotation controller preferably allows a user to vary the rate of rotation of the rotator depending on the size of the container and/or the viscosity of contents of the container. In the latter case, the higher the viscosity of the contents of the container, the slower the rotation controller allows the rotator to rotate the container.

The chilling station may preferably include a container positioning wall disposed within the container bay adapted to position the container optimally with respect to the spray jet outlet. The positioning wall is preferably laterally adjustable toward and away from the roller via means for adjusting the lateral position of the positioning wall. The position adjusting means may be a threaded bolt attaching the positioning wall to the container bay; in this embodiment, the positioning wall is continuously adjustable. Alternatively, the adjusting means includes a notched bolt having at least two notches interactable with the container bay; in this case, the positioning wall is discretely adjustable depending upon which of the notches is interacting with the container bay.

Generally speaking, the invention is a system for chilling commercial quantities of hot food liquids such as stock, soups, sauces, and gravies and includes a commercial stock chiller having a housing, a rotating mechanism disposed in the housing, and a faucet or spray jet in communication with a cooling medium reservoir (e.g., an ice-water bath). Sealed containers of hot stock are placed on the rotating mechanism, and cooling medium is substantially continuously sprayed/poured over the container as it is rotated about its longitudinal axis. The contents of the container can be cooled from a cooking temperature (e.g., ~190° F.) to a cold storage temperature (e.g., ~40° F.) very rapidly. The rotation rate of the containers varies based on container diameter and the viscosity of the liquid contained.

The inventive system also includes a special container for holding quantities of stock/food to be chilled. The container includes a void volume, preferably at least 5% void volume, included in the container once the lid is attached. The container side is substantially straight (i.e., the container is substantially a regular cylinder) to allow for rotation with little interference or splashing. A handle is provided in the lid of the container for ease of carrying, ease of placement, and ease of tightening the lid. The container is stackable, and it preferably includes a protrusion on one of the top of the lid or the bottom of the base and a mating recess on the other of the top of the lid or the bottom of the base.

If the protrusion is provided on the lid (and the recess on the bottom of the base), the container is provided with a toot will allow for both tightening and removing the lid. The tool includes a wrench for gripping the protrusion and a fixed mounting station having a similar protrusion onto which the recess of the base of the container is placed. The handle of the container is preferably disposed within the perimeter of the protrusion on top of the lid.

BRIEF DESCRIPTION OF THE DRAWINGS

FIG. 2D is an enlarged top elevation view of the commercial stock chiller of FIG. I in accordance with the invention.

DETAILED DESCRIPTION OF THE INVENTION AND DRAWINGS

Description will now be given of one or more embodiments of the invention with reference to the attached FIGS. 1-11. It should be understood that this description and these drawings are exemplary in nature and in no way serve to limit the scope of the invention, which is defined by the claims appearing hereinbelow.

Figure 1A:
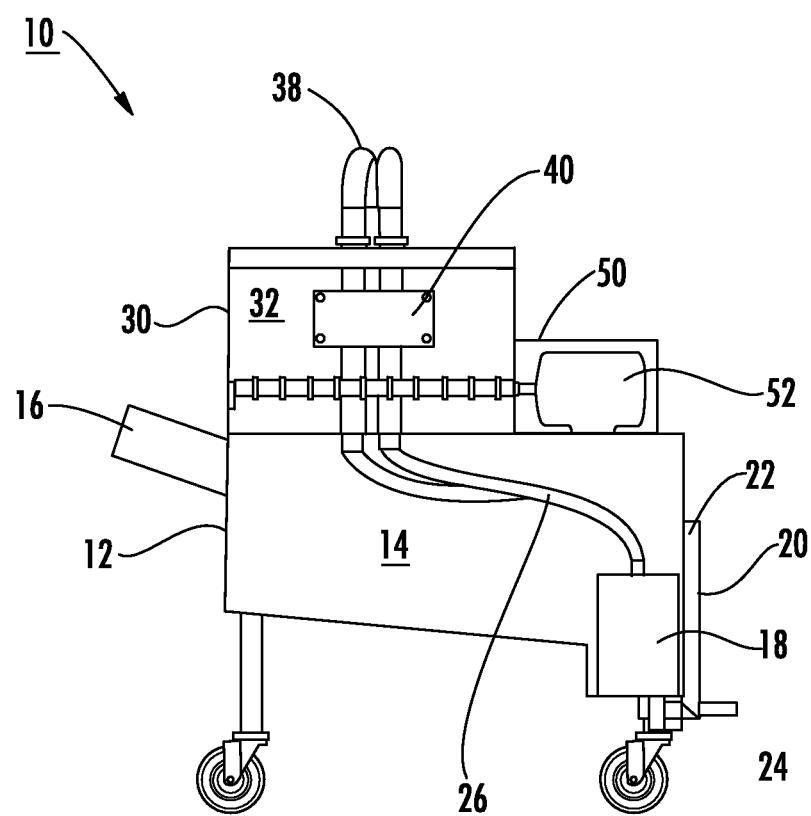
FIG. 1A is a side elevational view of a commercial stock chiller and chilling station in accordance with the invention.
Figure 1B:
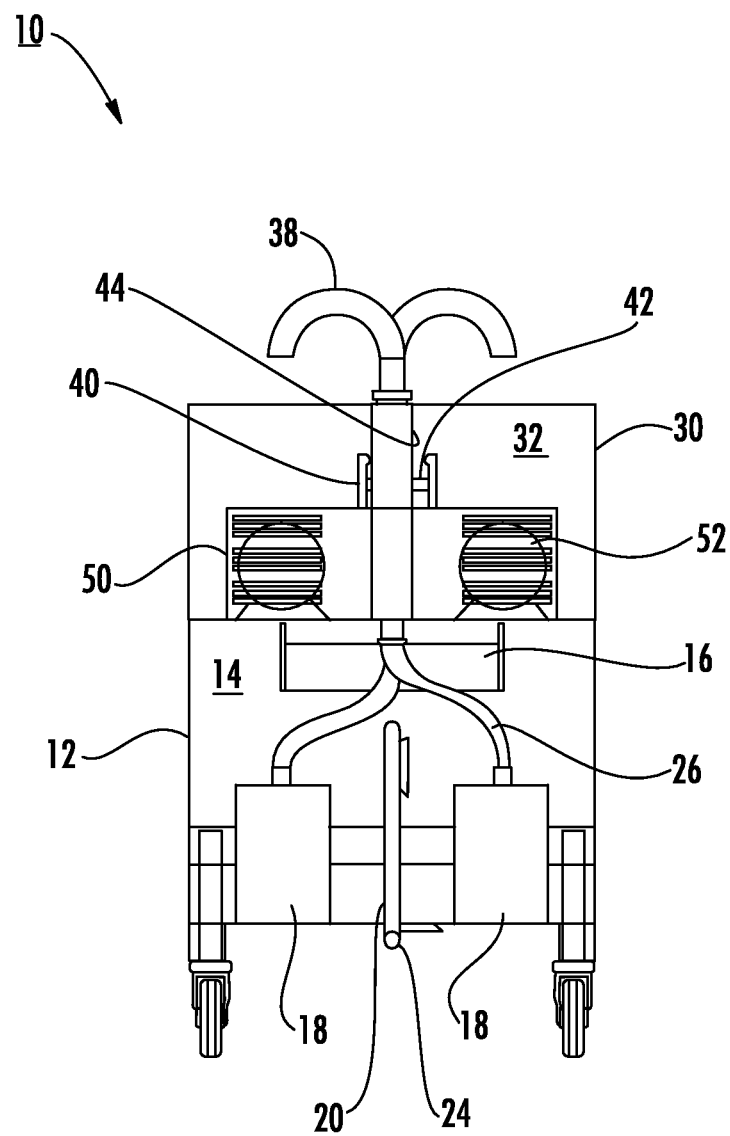
FIG. 1B is a rear elevational view of a commercial stock chiller and chilling station in accordance with the invention.

FIGS. 1-2 depict an exemplary chilling station in the form of commercial stock chiller 10 in accordance with the invention. (It should be noted that, although the device is predominantly referred to as a "stock chiller," the invention is equally usable for all hot bulk food liquids, including but not limited to stocks, soups, sauces, gravies, and the like.) Lower housing 12 defines reservoir 14 into which water and ice are to be replenishably disposed. Ice may be introduced via ice chute 16, and water may be introduced over the top of the housing, via a direct water hookup, or by other means. Pumps 18 are provided to circulate water from reservoir 14 to the upper portion of the device (to be explained below) via tubing 26. Drain 20 is provided in communication with reservoir 14 to prevent the reservoir from being overfilled and to enable the reservoir to be drained as needed. The floor of reservoir 14 is tilted slightly to ensure that pumps 18 are always primed and to facilitate draining reservoir 14 via drain 20. Upper end 22 of drain 20 serves as a spillway to prevent overfilling of the reservoir, while lower end 24 allows water to leave the reservoir (either because it is at too high a level or because the reservoir is being drained). Upper end 22 may also serve as a water inlet for adding liquid water to reservoir 14.

Upper housing 30 includes one or more cooling bays 32; the preferred embodiment shown in the figures has two cooling bays, however more or fewer may be provided without departing from the scope of the invention. Disposed within each cooling bay 32 is a roller 34 having at least one frictional element 36, shown as O-rings here as an example, disposed thereon. Alternatively, roller 34 may be covered in whole or in part by a substantially continuous frictional sheeting material (e.g., rubber) rather than discrete O-rings. In any event, roller 34 is provided as one embodiment of a container rotator for rotating a container (to be described) of hot stock about the container's longitudinal axis (other embodiments of the container rotator will be described below). Mounted above roller 34 is a faucet or spigot 38 in fluid communication with tubing 26 and thus with pump 18. Faucet 38 delivers ice cold water (or whatever other cooling medium is provided to reservoir 14) to a container disposed in cooling bay 32. Faucet 38 is preferably swivelable so that large containers may be inserted into and removed from cooling bay 32. A cover (not shown) may be utilized to prevent splashing.

Figure 11:
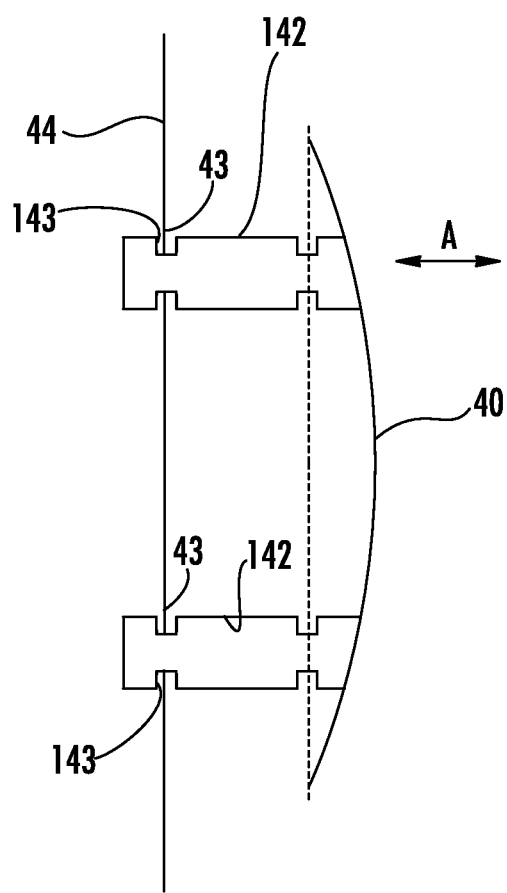
FIG. 11 is a side sectional schematic view of an embodiment of a positioning wall lateral position adjusting mechanism in accordance with the invention.

Adjustably mounted on a wall 44 of cooling bay 32 is a positioner 40 for insuring that a container to be cooled sits properly atop roller 34 and underneath faucet 38. In one embodiment, positioner 40 may be adjustable via a screw threaded device such as screw 42, which serves to adjust the distance the positioner protrudes from wall 44. In another, preferred embodiment, as shown in FIG. 11, positioner 40 is connected to wall 44 via bolts 142 having two or more notches 143. Bolts 142 pass through holes or slots 43 in wall 44. Slots 43 are adapted to catch the bolts 142 at notches 143. In this way, by moving positioner back and forth in the direction of arrow A of FIG. 11, the lateral position of positioner 40 can be adjusted between two positions corresponding to which notch 143 engages slot 43 in wall 44, corresponding to different sized containers being placed in the container bay. For example, a larger container (e.g., five gallons) would require that positioner 40 be moved as close to wall 44 as possible, while a smaller container (e.g., one or two gallons) would require that positioner 40 be moved away from wall 44 to better support and position the smaller container.

The positioner is preferably a convex structure that tends to keep the container (while it is being rotated) centered at the most outward-bowing portion of the positioner. If the rollers are to be rotated in the opposite direction, a concave positioner may be employed. As explained, the adjustable positioner, be it screw threads or notched bolts, will allow the user to select the proper lateral position of the positioner depending on the size (diameter) of the container being used. The positioner should be adjusted such that the normalized force of the container will sit as high on the roller as possible. This will reduce slippage.

Figure 2A:
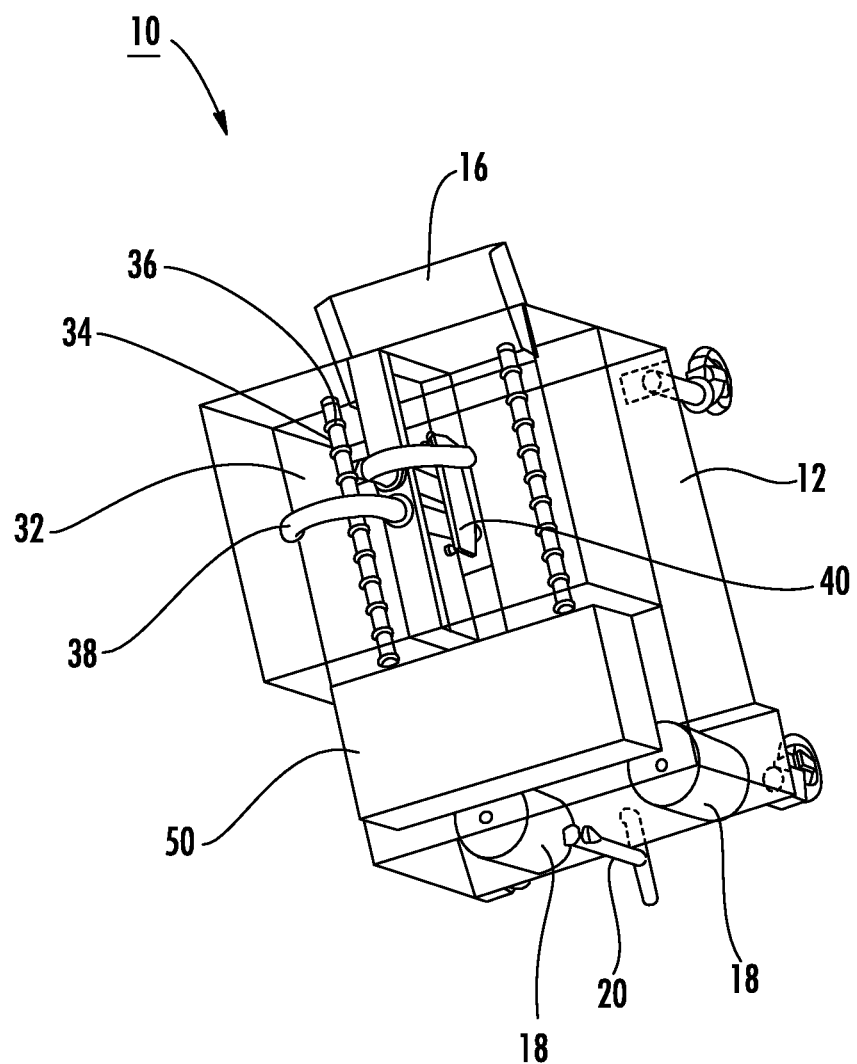
FIG. 2A is a top perspective view of a commercial stock chiller in accordance with the invention.
Figure 2B:
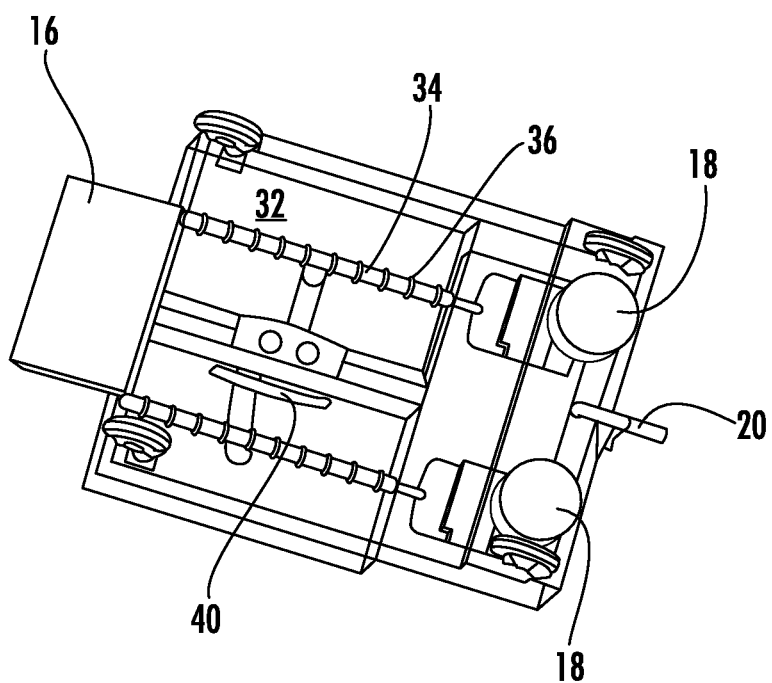
FIG. 2B is a bottom perspective view of the commercial stock chiller of FIG. 1 in accordance with the invention.
Figure 2C:
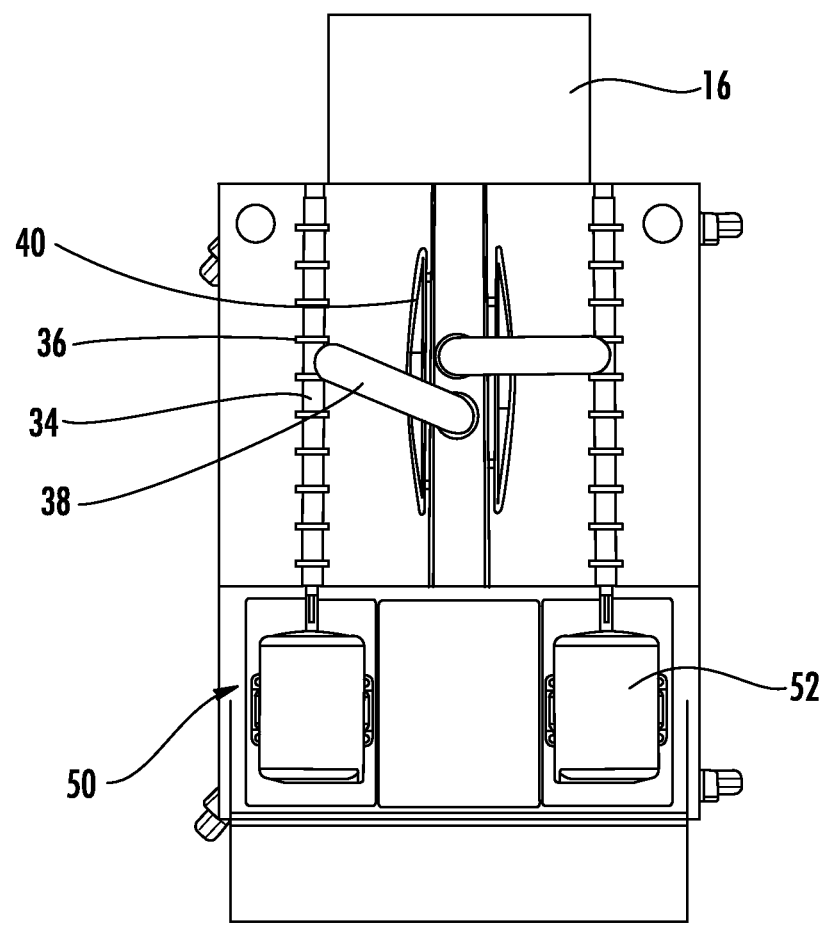
FIG. 2C is a top elevation view of the commercial stock chiller of FIG. 1 in accordance with the invention.
Figure 2E:
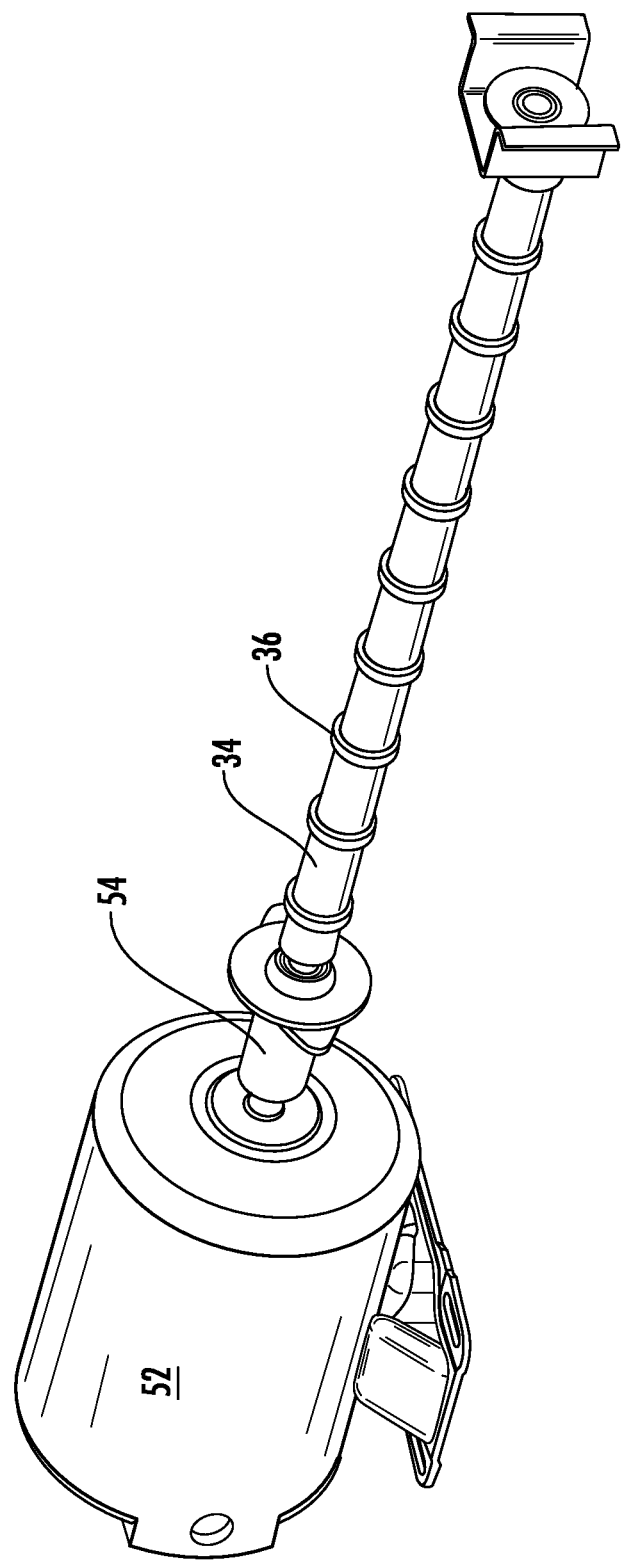
FIG. 2E is a perspective view of one embodiment of the container rotator of the inventive chilling station in accordance with the invention.
Figure 2F:
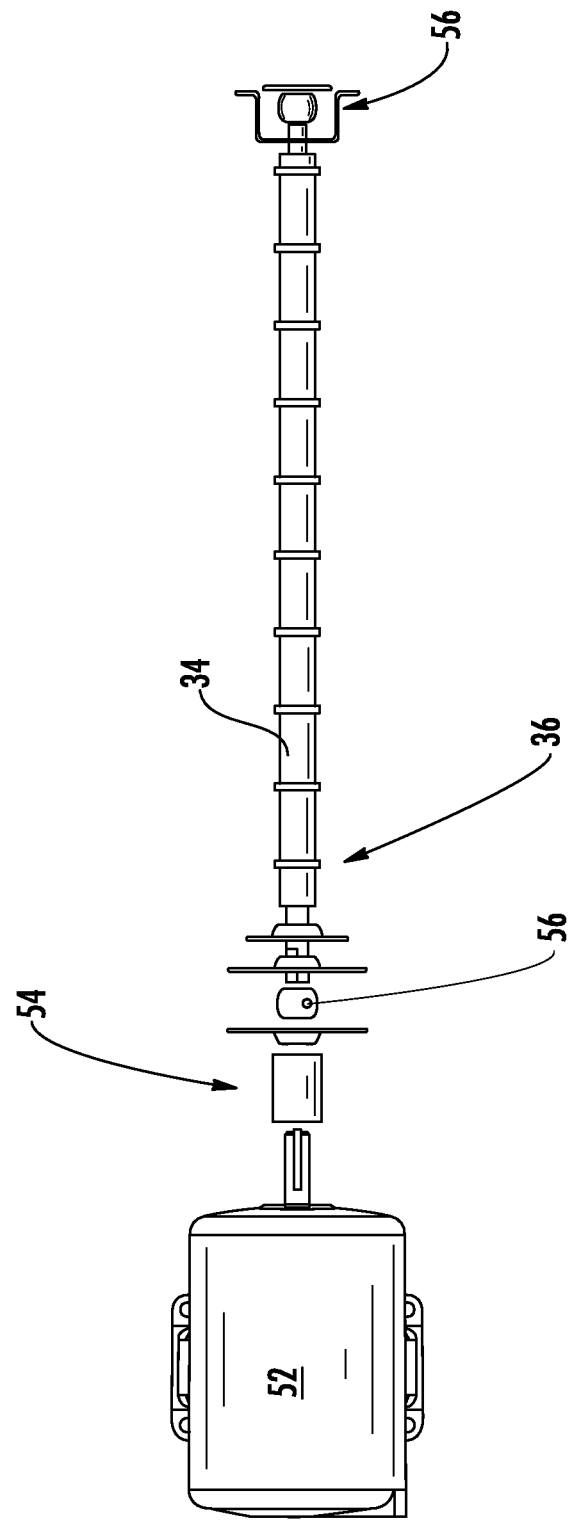
FIG. 2F is a side elevation view of the container rotator of FIG. 2E.

Chilling station 10 includes a motor housing 50 (see FIGS. 2A, 2C) which houses motors 52 used to rotate the container rotators, e.g., rollers 34. The connection of a motor 52 to a roller 34 is shown in FIGS. 2E-F, for example. In the preferred embodiment, roller 34 is connected to motor 52 via spider coupling 54 or a similar connector. Bearings 56 are provided to facilitate rotation.

Figure 3:
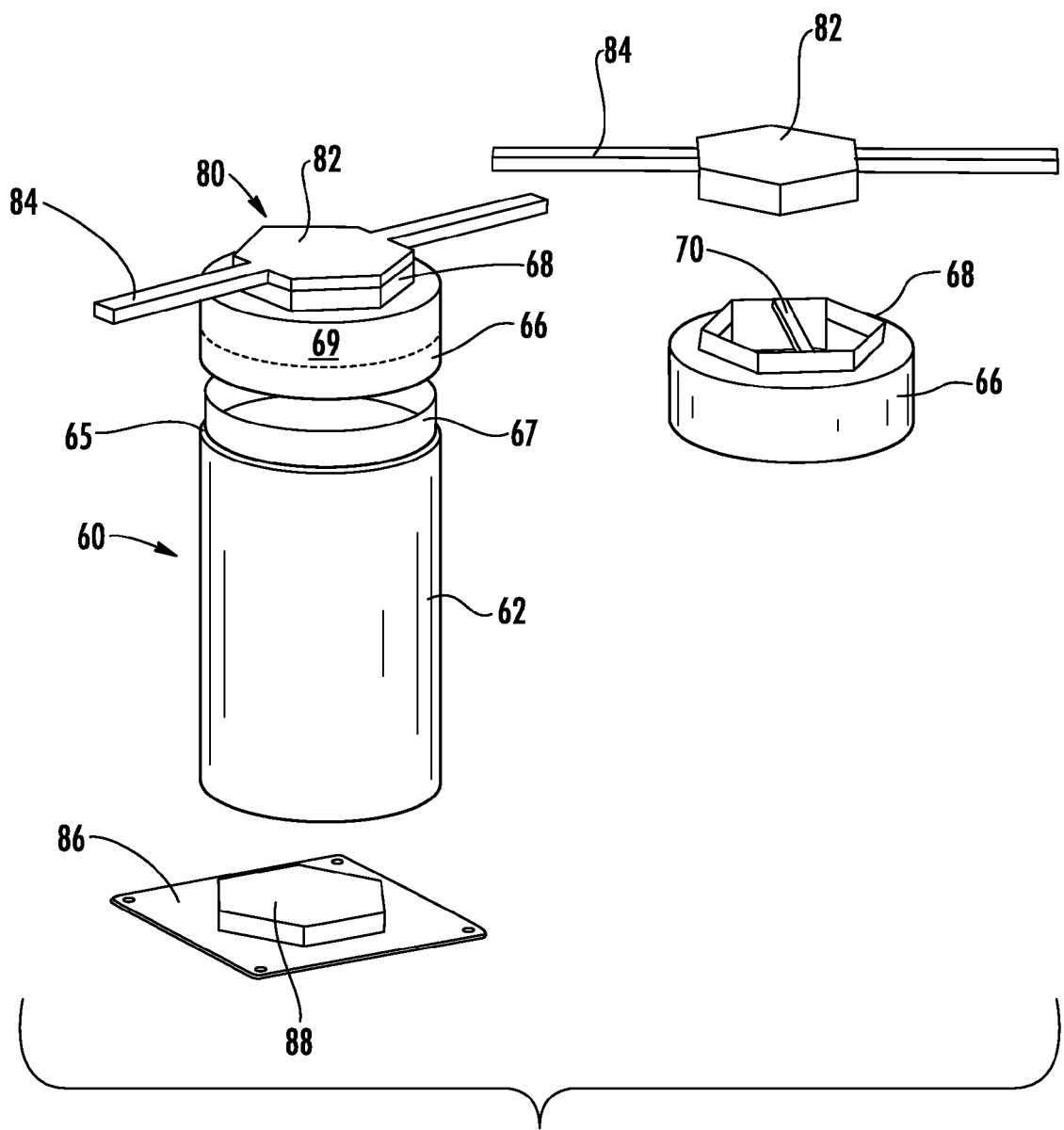
FIG. 3 is an upper perspective view of a stock chilling container, associated tightening tool, and container tightening station in accordance with the invention.
Figure 4:
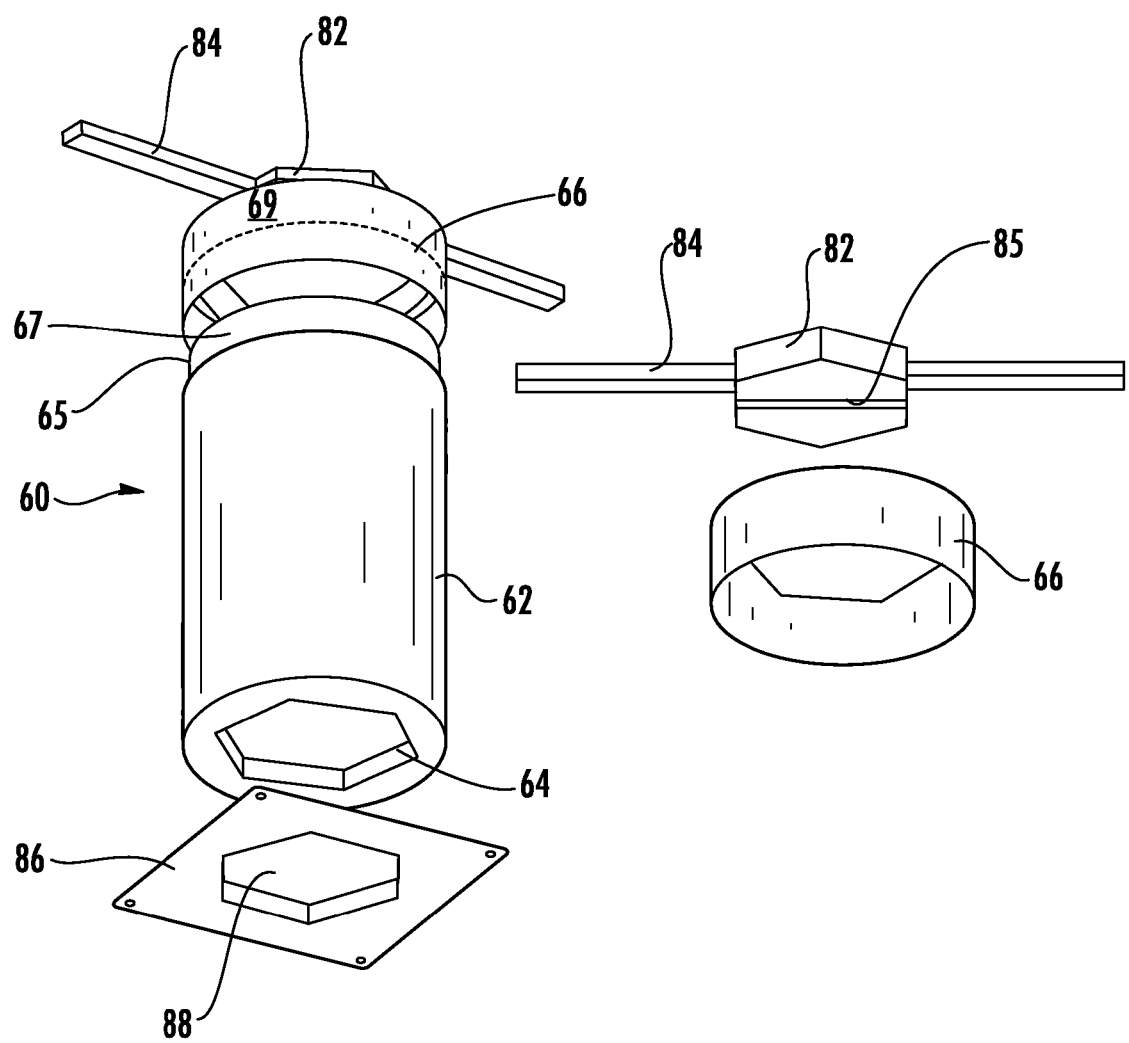
FIG. 4 is a lower perspective view of the stock chilling container, associated tightening tool, and container tightening station of FIG. 3 in accordance with the invention.
Figure 5:
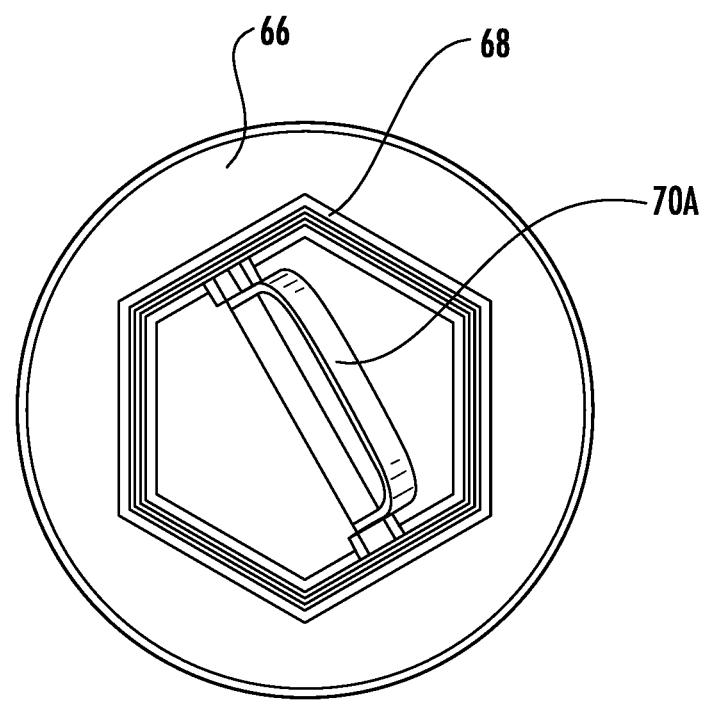
FIG. 5 is a top clevational view of a lid of a stock chilling container in accordance with the invention.

FIGS. 3 and 4 depict an embodiment of the inventive stock chilling and storing container 60 to be used with the chilling device 10 of FIGS. 1-2. Container 60 includes a hollow base 62 which serves to contain a quantity of stock, soup, sauce, or the like. Base 62 is preferably a substantially straight cylinder to allow for smooth rotation with limited interference or splashing. The bottom of base 62 is preferably provided with a recess 64 to be explained below.

Lid 66 is designed to seal to the top of base 62. Several different mechanisms of attaching lid 66 to base 62 are shown in the drawings in FIGS. 8-A-E. For example, in FIGS. 8A-B, container housing 62 is provided with threads 90A, and lid 66 is provided with mating threads 90B. Lid 90B is threaded onto the top of housing 62 in a conventional manner.

Figure 8A:
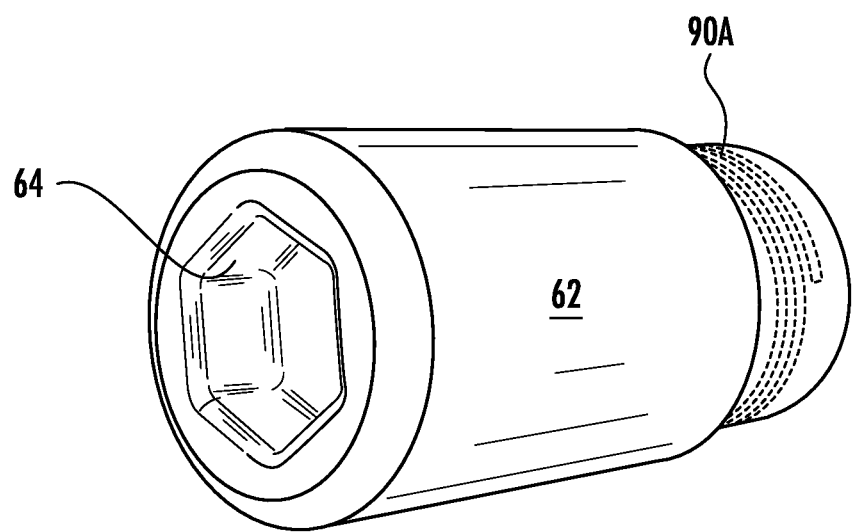
FIGS. 8A-B are perspective views of a threaded attachment mechanism connecting the lid and container housing in accordance with the invention.
Figure 8B:
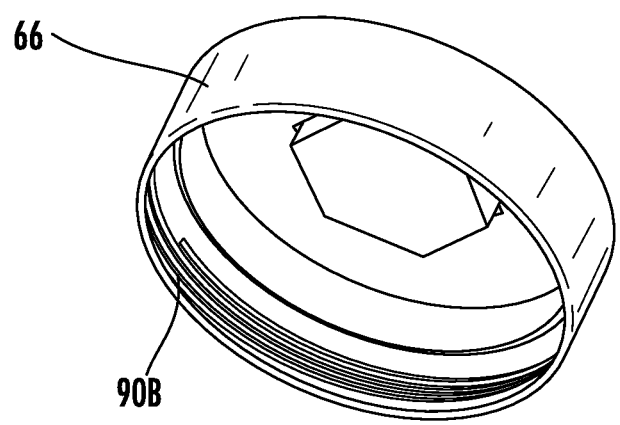
Figure 8C:
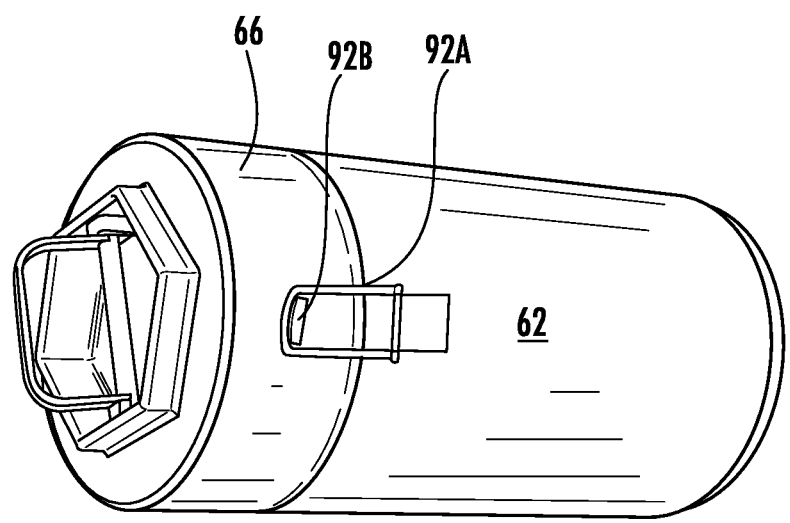
FIG. 8C is a perspective view of a latched embodiment of the attachment mechanism connecting the lid and container housing in accordance with the invention.

Another attachment mechanism is shown in FIG. 8C. In this embodiment, housing 62 is provided with a latch 92A, and lid 66 is provided with a catch 92B. Latch 92A is brought up around and secured to catch 92B, forming a tight fit. Alternatively, the latch may be mounted on lid 66 and the corresponding catch may be mounted on housing 62.

Figure 8D:
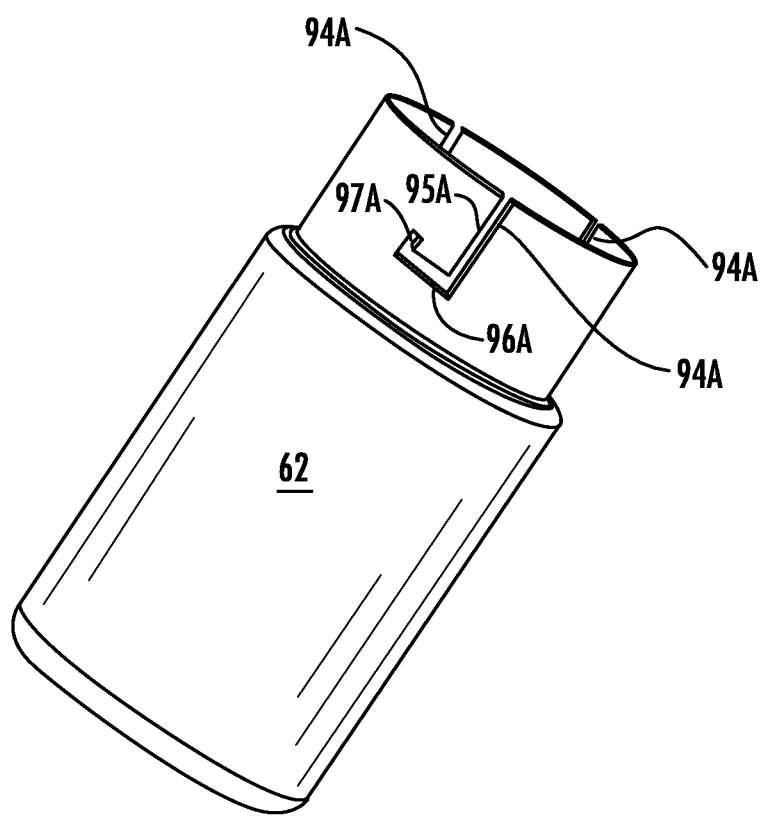
FIGS. 8D-E are perspective views of a bayonet fining attachment mechanism connecting the lid and container housing in accordance with the invention.
Figure 8E:
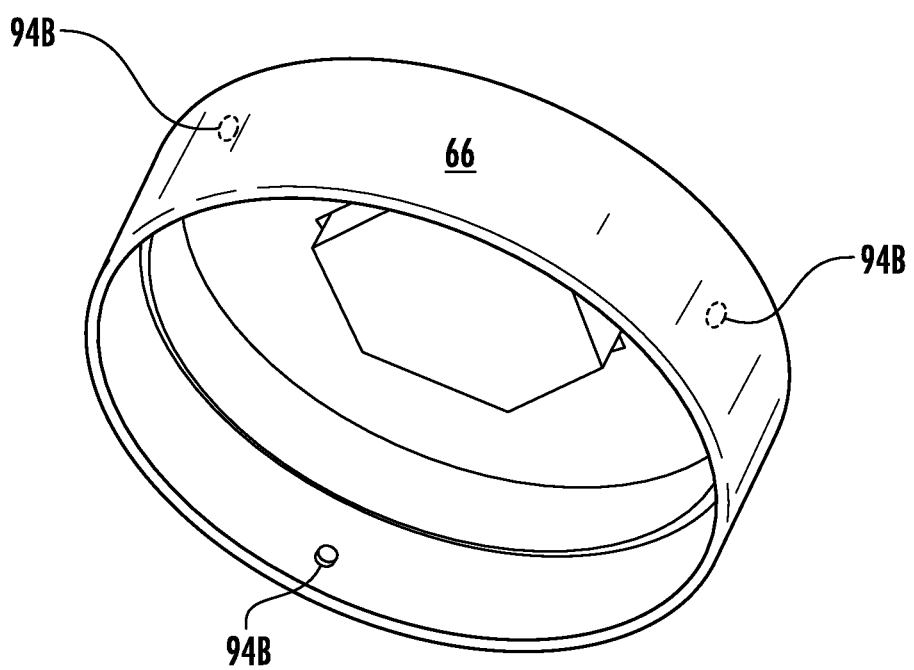

Still another mechanism is shown in FIGS. 8D-E. The upper rim of container housing 62 may be provided with a bayonet channel 94A (see FIG. 8D) which matingly engages with a corresponding projection 94B formed on lid 66. Bayonet channel 94A preferably includes a first vertical section 95A, a horizontal section 96A, and a second vertical section 97A. Projection 94B is adapted to fit within first vertical section 95A and bottom out just short of (i.e., above) horizontal section 96A. When the user presses firmly down (i.e., longitudinally) on lid 66 against container housing 62, a seal, gasket, or other resilient member (not shown) is compressed, lid 66 moves slightly closer to housing 62, and projection 94B is thus aligned with horizontal section 96A. The user then twists lid 66 relative to housing 62 so that projection 94B travels along the length of horizontal section 96A until it abuts against the far wall of second vertical section 97A. At this point, the user releases the longitudinal pressure on the lid relative to the housing; the seal or gasket (or other resilient member) expands, and projection 94B is moved upward and trapped within second vertical section 97A. FIGS. 8D-E show the use of three channels 94A and three corresponding projections 94B, however any convenient number may be employed. Additionally, while the channel 94A is shown having three distinct and substantially orthogonal sections 95A, 96A, and 97A, other configurations of channels with non-orthogonal or curved portions may be employed.

Regardless of the attachment mechanism, an O-ring or similar seal (not shown) is provided either on lid 66 or the shoulder 65 of base 62 so that a tight seal may be made between the lid and the base, preferably an air- or water-tight seal.

Lid 66 is provided with a protrusion 68 shaped substantially identically to recess 64 of base 62. In this way, multiple containers 60 may be stacked and stored in a space-efficient manner. A handle 70 is preferably provided on lid 66, preferably within the perimeter of protrusion 68, to facilitate handling of the container.

In addition to maximizing stacking and storing, protrusion 68 and recess 64 also serve to allow a user to tighten and loosen lid 66 from base 62 to a much greater degree. A tightening system is preferably provided along with the stock chiller and containers, which includes a tightening tool 80 and a tightening station 86 (see FIGS. 3 and 4). Tool 80 has a central body 82 which corresponds in shape to that of protrusion 68; body 82 either fits inside the perimeter of protrusion 68 or around it (see tool 80A of FIG. 7, for example). In either case, tool 80, 80A includes one or more handles or arms 84 for providing a better grip and additional torque for a single user to turn the lid with respect to the base. To insure that base 62 does not slip during tightening or loosening, base 62 is disposed on tightening station 86, which includes a protrusion 88 for engaging recess 64. This way, when a user tightens or loosens a lid 66, he need not struggle with the base to keep it motionless.

Figure 6:
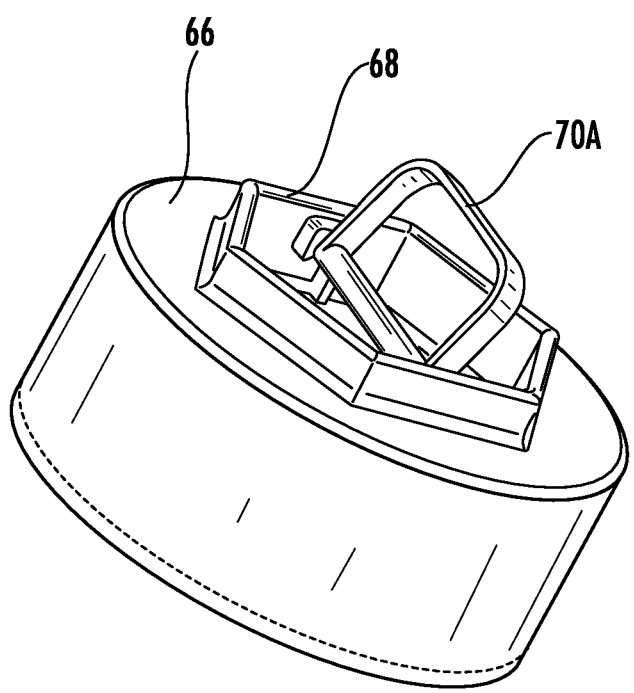
FIG. 6 a side perspective view of the lid of a stock chilling container of FIG. 5 in accordance with the invention.
Figure 7:
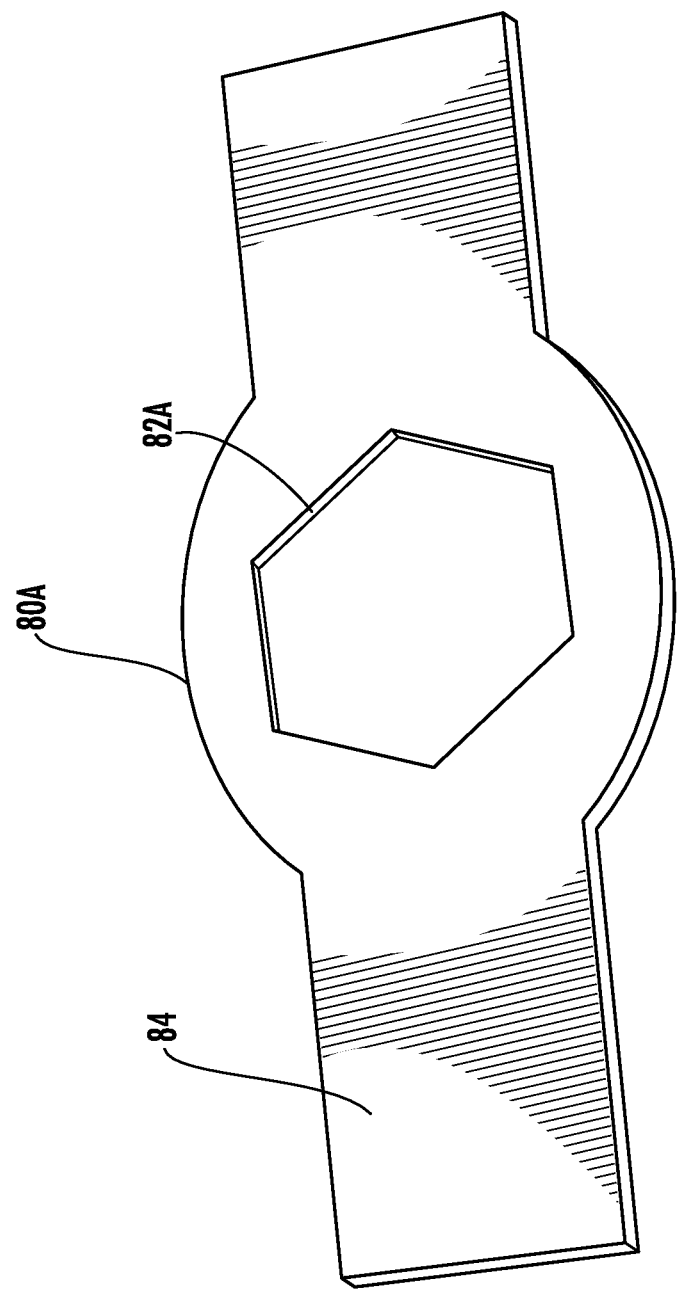
FIG. 7 is a top perspective schematic of another embodiment of a tightening tool in accordance with the invention.

Handle 70 shown in FIG. 3 is a simple straight bar disposed within protrusion 68. For such an embodiment, body 82 of tool 80 is provided with a slot 85 for engaging/accommodating the handle. FIGS. 6 and 7 show an improved handle 70A which swivels up and down. Tool 80A need not engage handle 70A at all, but rather engages the outer perimeter of protrusion 66.

By providing protrusion 66 and recess 64, alternate means of rotating the containers 60 may be provided than using rollers 34 described above. For example, as shown in FIG.

10, container rotator 130 includes a first mount 132 having a projection or block 134 designed to fit within recess 64 of container housing 62. Rotator 130 may also (or in the alternative) include a second mount 136 having a recess 138 designed to fit around projection 68 of container lid 66. One or both of mounts 132 and 136 may be spring mounted so as to be movable out of the way to accommodate the insertion and removal of a container. Alternatively, one or both mounts may be moved via ball screws, a clamping handle, or other mechanical means (not shown). The provision of rotator 130 reduces the importance of positioner 40 and substantially eliminates the need for rollers 34.

To insure that the stock contained within container 60 mixes adequately when the container is being rotated and sprayed to thereby maximize heat transfer out of the stock, container 60 is provided with an inherent void volume built into the lid. The void volume is an amount of air space included in the container once the lid is sealed on tight. Container 60 may be filled up to the top edge of rim 67, however when lid 66 is attached onto base 62, the upper portion 69 of lid 66 extends above the top edge of rim 67, thereby necessarily trapping air and preventing a sealed container 60 from being completely full. The void volume is preferably 5% of the volume of the closed container but can be as little as 1-2% and still be effective.

The preferred embodiment of the container is made from food grade stainless steel and includes a plastic liner. The container is cylindrical in shape, available in different sizes (e.g., 1 gallon, 2 gallons, 5 gallons).

Rotation rate of the rotator may be user-selectable based on the dimensions of the container being used and may be user-selectable depending on the viscosity of the hot bulk liquid being chilled. The inventors have discovered that the higher the viscosity of the hot bulk liquid to be chilled, the slower the optimum rotation rate of the container (and thus the rotator). For example, approximately two gallons of a liquid similar to water (e.g., stock) with a viscosity close to 1 cp is optimally cooled in a rotation range of 200-250 rpm. Approximately two gallons of dilute sauce having a viscosity of roughly 780 cp is optimally cooled at a rotation rate of 130-140 rpm. Approximately two gallons of a thicker sauce (2340 cp) requires a rotation rate of 80-90 cp for optimal cooling.

Figure 9:
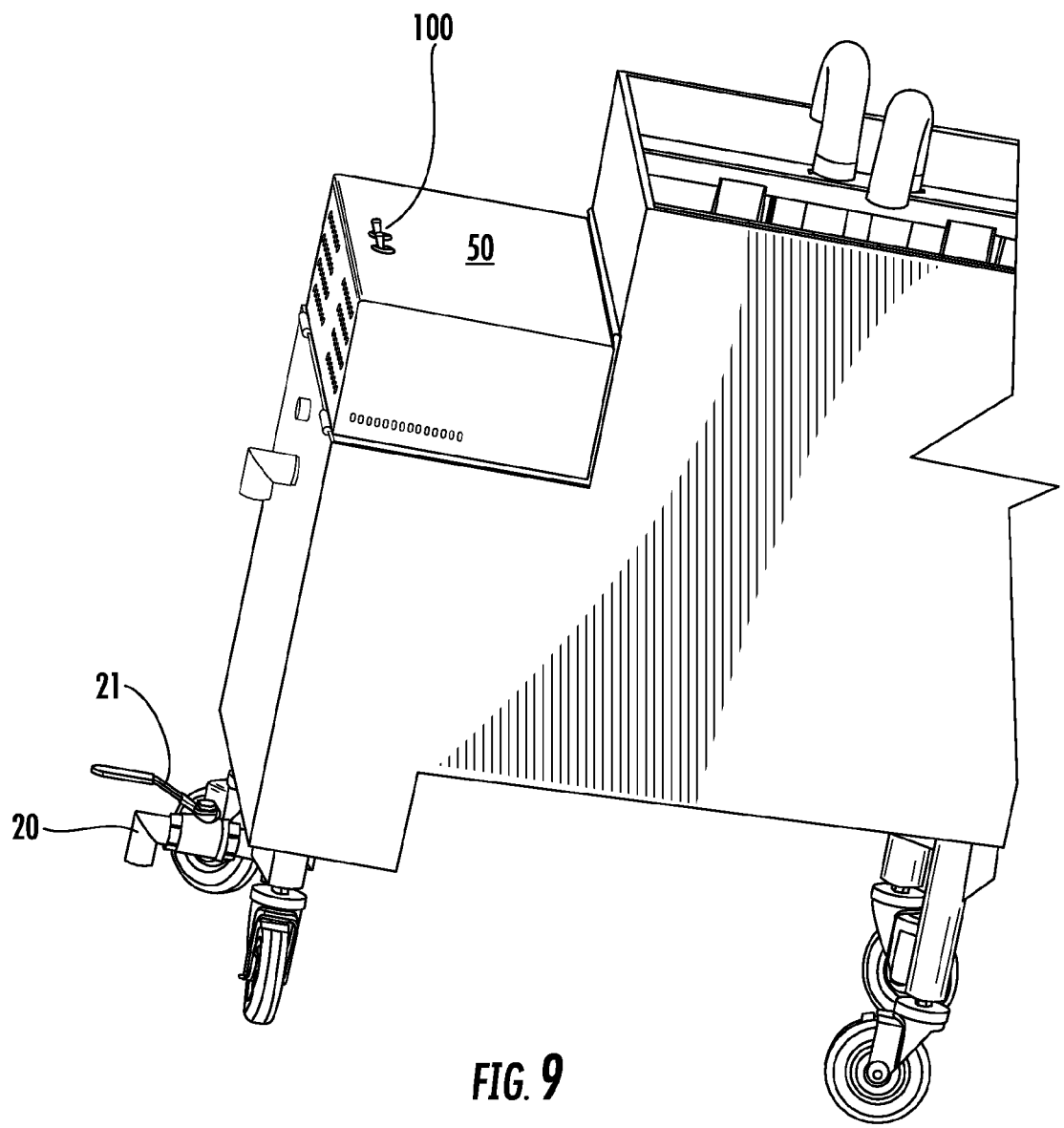
FIG. 9 is a side perspective view of one embodiment of a chilling station in accordance with the invention.
Figure 10:
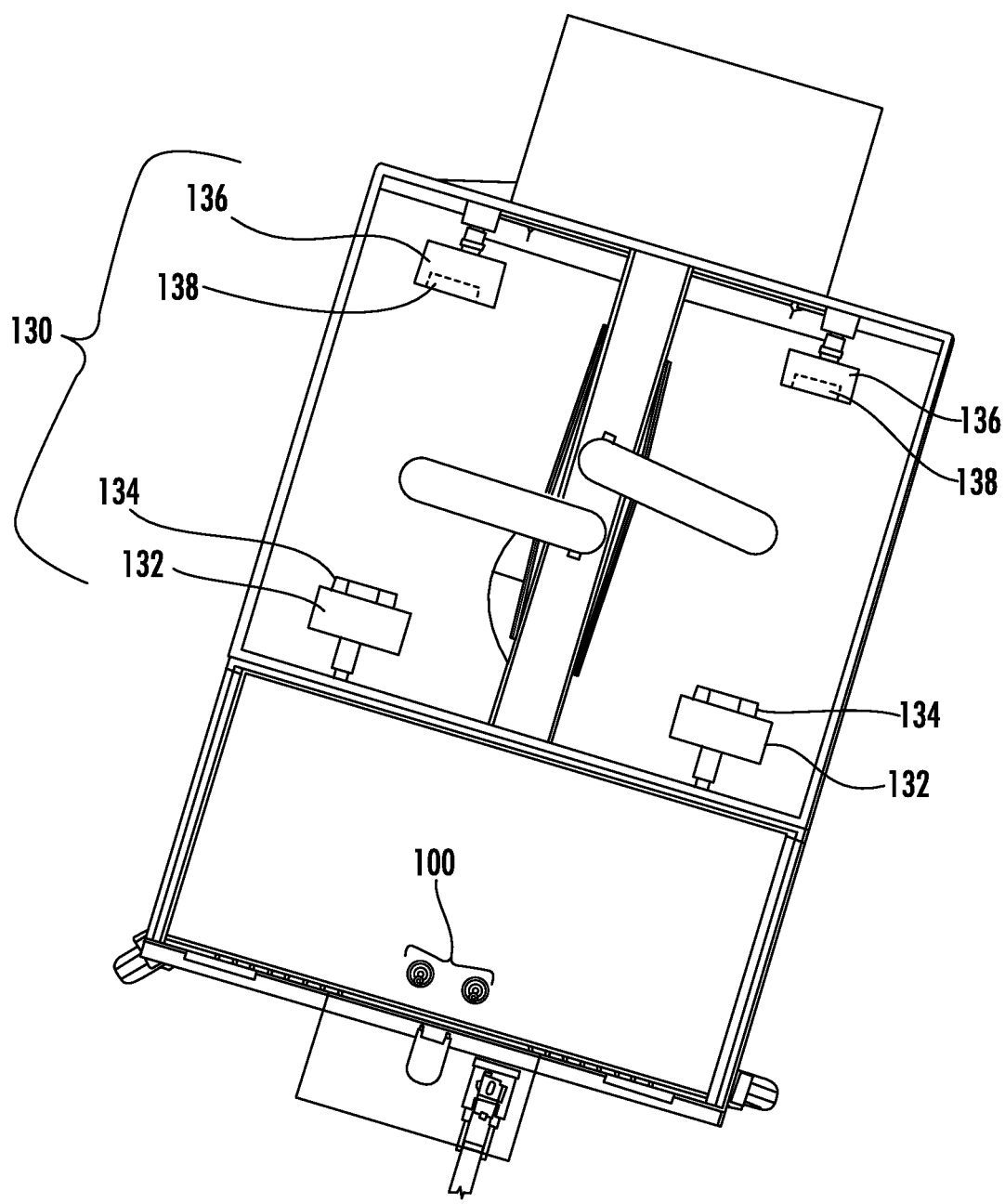
FIG. 10 is a top elevation view of another embodiment of the container rotator in accordance with the invention.

As such, chilling station 10 is preferably provided with rotation controls 100 (see FIGS. 9 and 10). Controls 100 may be as simple as an on-off switch for activating or deactivating motors 52, or they may include a variety of settings that allow the user to change the speed of motors 52 and thus the rotation rate of the containers. Settings may be based on the size of the containers (e.g., 1 gallon, 2 gallon, 5 gallon containers) and/or may be based on the type of hot bulk liquid being cooled (i.e., the thickness or viscosity, e.g., stock, soup, gravy, thin sauce, thick sauce, etc.).

In operation, the inventive system works as follows. A commercial kitchen makes a large quantity of stock (e.g., 100 gallons), and when the stock is finished, it is at or near 190° F. A kitchen worker removes a relatively small quantity (1-5 gallons) of the stock and places it in one of the inventive containers. Container 60 is filled, and lid 66 of the container is secured to the base 62 of the container. Because upper portion 69 of lid 66 extends above the top edge of rim 67 of base 62, air is trapped inside container 60 when it is closed (at least 1% of the volume of the container, preferably at least 5%). Container base 62 is placed on tightening station 86 so that protrusion 88 fits securely within recess 64 on the underside of container base 62. The kitchen worker fits the main body 82 of tool 80 onto protrusion 68 of lid 66 (or, alternatively, fits hole 82A of tool 80A over/around protrusion 68), grasps handles 84, and twists lid 66 shut onto base 62.

The sealed container is then placed in a cooling bay 32 atop roller 34 and leaned against positioner 40. Positioner 40 is adjusted to the proper lateral position, either via screw threads 42 or by sliding bolts 142 until notches 143 fit into corresponding holes or slots 43 in wall 44. Alternatively, block 134 of rotator mount 132 is fitted into recess 64 of container housing 62 and recess 138 of rotator mount 136 is fitted around projection 68 of container lid 66. Rotator mounts 132 and 136 are preferably secured tightly around the container. Alternatively or in addition, a lathe chuck may be employed.

Reservoir 14 is filled with ice (e.g., via chute 16) and water (e.g., via inlet/spillway 22), and the user selects the proper mode of operation of the chilling station via controls 100, based on container size, viscosity of contents, etc. Chilling station 10 is thus activated. Roller 34 frictionally engages container 60 and causes it to rotate about its longitudinal axis, or rotator 130 simply rotates the container directly. The container is rotated at a rate of 50-350 rpm, depending on the size of the container (the larger the container, the slower it rotates) and the viscosity of the contents of the container (the more viscous the contents, e.g., sauce as opposed to consomme, the slower the container is rotated). Water from reservoir 14 is pumped up to spigot 38 where it is sprayed onto the rotating container 60. After about 2-6 minutes (depending on container size), the stock inside the container has been cooled past the danger zone to about 40° F. and is safe for storage in a refrigerator. Because the container is sealed prior to cooling, a partial vacuum is created as the contents cool, thereby enhancing the seal and security of the container. The kitchen worker typically marks the date, time, and contents of the container and places it in a refrigerator.

The kitchen worker may check the temperature of the contents of the container prior to and after the chilling process to insure the contents have reached the proper temperature. To avoid the opening and closing of the container unnecessarily, an integral thermometer (not shown) may be provided with every container that readily displays the temperature of the contents to a kitchen worker without requiring the container to be opened. An analog thermometer may be used with an externally visible display, or alternatively, an internal thermometer connected to a passive RFID-type device may be employed to allow the container to be scanned. It is preferred that the container not require a separate power source to operate the thermometer.

Because the preferred embodiment has two cooling bays, up to 10 gallons of stock may be cooled at a time in a 2-6 minute period. With the additional steps of marking and storing the containers, an entire 100 gallon batch of stock can be cooled in roughly 30-40 minutes. Ice is typically added during the process via ice chute 16; alternatively, chilling station 10 may include an integral ice maker (not shown). Multiple containers can be stacked securely since the protrusion 68 of the lid 66 of one container will fit within the recess 64 of the base 62 of another container.

A commercial embodiment of the inventive chilling station is approximately 34-35 inches long, 26 inches wide, and 44-46 inches high. The flow rate of the cooling medium is roughly 50 liters per minute. This embodiment uses the roller version of the container rotator; the rotation rate for the rollers themselves are in the range of 1750 rpm. The rotation rate of a 2 gallon container in this embodiment is 200-250 rpm when it is holding stock or a similarly thin liquid. The container bay can accommodate two containers at a time. Each container bay's roller is powered by motors producing roughly 0.25-0.50 hp.

Having described certain embodiments of the invention, it should be understood that the invention is not limited to the above description or the attached exemplary drawings. Rather, the scope of the invention is defined by the claims appearing hereinbelow and any equivalents thereof as would be appreciated by one of ordinary skill in the art.

What is claimed is:

1. A method of deterring bacterial growth in food liquids by rapidly cooling hot bulk food liquids from a temperature of equal to or greater than 140° F., comprising the steps of:
    placing a hot bulk food liquid having a viscosity and an initial temperature equal to or greater than 140° F. in a resealable container having a size and an inherent void volume that traps air in contact with the hot bulk food liquid;
    placing the container in a substantially horizontal orientation;
    rotating the container substantially about its longitudinal axis; and
    spraying the surface of the container with a cooling medium while the container is rotating,
    wherein when a target temperature in the bulk food liquid is reached, bacterial growth in the food liquid is deterred.

2. The method of deterring bacterial growth in food liquids by rapidly cooling hot bulk food liquids according to claim 1, further comprising the step of varying the speed of rotation of the container depending on the viscosity of the hot bulk food liquid to be cooled.

3. The method of deterring bacterial growth in food liquids by rapidly cooling hot bulk food liquids according to claim 2, wherein the greater the viscosity of the hot bulk food liquid to be cooled, the slower the rotation rate of the container during the rotating step.

4. The method of deterring bacterial growth in food liquids by rapidly cooling hot bulk food liquids according to claim 1, wherein said rotating and spraying steps are performed until the hot bulk food liquid is cooled to approximately 5° C.

5. The method of deterring bacterial growth in food liquids by rapidly cooling hot bulk food liquids according to claim 1, wherein said rotating and spraying steps are performed until a partial vacuum is created within the container.

6. The method of deterring bacterial growth in food liquids by rapidly cooling hot bulk food liquids according to claim 1, wherein the flow rate of the cooling medium being sprayed is at least approximately 50 LPM.

7. The method of deterring bacterial growth in food liquids by rapidly cooling hot bulk food liquids according to claim 1, further comprising the step of providing a reservoir for the cooling medium, wherein the temperature of the cooling medium at least in the reservoir is approximately 0° C.

8. The method of deterring bacterial growth in food liquids by rapidly cooling hot bulk food liquids according to claim 1, further comprising the step of passively positioning the container with respect to a spray jet for the cooling medium by rotating the container against a longitudinally curved convex positioning wall, wherein rotation of the container against the positioning wall keeps the container substantially at the most outward-bowing portion of the positioning wall.

9. A resealable container for deterring bacterial growth in food liquids by rapidly cooling hot bulk food liquids having an initial temperature of equal to or greater than 140° F. by way of rotating the container about its longitudinal axis and spraying the container with a cooling medium, the container comprising:
    a substantially smooth cylindrical housing;
    a top sealingly attachable to and removable from said housing, said top including an inherent void volume;
    attachment means for sealingly attaching said top to said housing, a first mating portion of said attachment means being disposed on said housing and a second mating portion of said attachment means being disposed on said top,
    wherein when said top is attached to said housing, said void volume of said top traps air in contact with the hot bulk food liquid inside said container even if said housing is completely filled prior to attachment of said top.

10. The resealable container for deterring bacterial growth in food liquids by rapidly cooling hot bulk food liquids according to claim 9, wherein said first mating portion comprises a first set of threads disposed on said housing and said second mating portion comprises a second set of threads disposed on said top.

11. The resealable container deterring bacterial growth in food liquids by for rapidly cooling hot bulk food liquids according to claim 10, further comprising a projection disposed on an upper surface of said top, said projection facilitating tightening of said top on said housing.

12. The resealable container for deterring bacterial growth in food liquids by rapidly cooling hot bulk food liquids according to claim 11, further comprising a recess formed on an underside of said housing, said recess adapted to fit atop a raised portion of a fixed container tightening and loosening station to substantially prevent said housing from moving when a user tightens or loosens said top on said housing.

13. The resealable container for deterring bacterial growth in food liquids by rapidly cooling hot bulk food liquids according to claim 12 wherein said recess is substantially the inverse of said projection atop said top, wherein multiple of said containers can thus be stacked with enhanced stability.

14. The resealable container for rapidly cooling hot bulk liquids according to claim 9, said attachment means comprising at least one of i) a bayonet fitting between said top and said housing; or ii) clips disposed on an exterior of said container.

15. The resealable container for deterring bacterial growth in food liquids by rapidly cooling hot bulk food liquids according to claim 9, further comprising a liner disposed within said housing.

16. A method of deterring bacterial growth in food liquids by rapidly cooling hot bulk food liquids from a temperature equal to or greater than 140° F., comprising the steps of:
    placing a hot bulk food liquid having a viscosity and a temperature equal to or greater than 140° F. in a resealable container;
    placing the container in a substantially horizontal orientation;
    rotating the container substantially about its longitudinal axis; and
    spraying the surface of the container with a cooling medium while the container is rotating,
    wherein said rotating step further includes varying the speed of rotation of the container depending on the viscosity of the hot bulk food liquid to be cooled.

17. A method of deterring bacterial growth in food liquids by rapidly cooling hot bulk food liquids according to claim 16, wherein the greater the viscosity of the hot bulk food liquid to be cooled, the slower the rotation rate of the container during the rotating step.

18. A system of deterring bacterial growth in food liquids by rapidly cooling hot bulk food liquids from a temperature equal to or greater than 140° F., comprising:
   a chilling station, comprising:
      a reservoir for holding a cooling medium, said reservoir including a reservoir outlet for removing excess of said cooling medium;
      a container bay disposed substantially above said reservoir adapted to receive at least one container of hot bulk food liquid having a viscosity and a temperature equal to or greater than 140° F. to be cooled, said container including a substantially smooth cylindrical container housing and a container top sealingly attachable to and removable from said housing;
      at least one rotator adapted to rotate said container placed in said container bay substantially around said container's longitudinal axis;
      a spray jet outlet, disposed substantially above said container bay and in fluid communication with said reservoir, adapted to spray said container with said cooling medium while said rotator is rotating said container; and
   a fixed container tightening and loosening station having an upward projection matingly engageable with a recess on a bottom of said container adapted to substantially prevent said container housing from moving when a user tightens or loosens said container top on said container housing when said container recess is fitted over said container tightening and loosening station projection.

19. The system of deterring bacterial growth in food liquids by rapidly cooling hot bulk food liquids according to claim 18, said reservoir further comprising an inlet for adding additional of said cooling medium.

20. The system of deterring bacterial growth in food liquids by rapidly cooling hot bulk food liquids according to claim 19, wherein said cooling medium comprises ice water.

21. The system of deterring bacterial growth in food liquids by rapidly cooling hot bulk food liquids according to claim 18, wherein said reservoir outlet comprises a drain and a valve, wherein when said valve is opened, said cooling medium exits said reservoir via said drain.

22. The system of deterring bacterial growth in food liquids by rapidly cooling hot bulk food liquids according to claim 21, further comprising a spillway in fluid communication with said reservoir, wherein when a level of said cooling medium reaches a level of said spillway, excess of said cooling medium exits said reservoir via said spillway.

23. The system of deterring bacterial growth in food liquids by rapidly cooling hot bulk food liquids according to claim 18, wherein said rotator comprises a roller with which said container is substantially placed in contact.

24. The system of rapidly cooling hot bulk liquids according to claim 23, said rotator further comprising:
   a block matable with said container recess on said container housing;
   a rotator recess matable with said projection on said container top; and
   means for moving said block toward and away from said rotator recess so as to secure said container disposed therebetween.

25. The system of deterring bacterial growth in food liquids by rapidly cooling hot bulk food liquids according to claim 23, further comprising a longitudinally curved convex container positioning wall disposed within said container bay adapted to position said container optimally with respect to said spray jet outlet.

26. The system of deterring bacterial growth in food liquids by rapidly cooling hot bulk food liquids according to claim 25, wherein said positioning wall is laterally adjustable toward and away from said roller via means for adjusting the lateral position of said positioning wall.

27. The system of rapidly cooling hot bulk liquids according to claim 26, wherein said adjusting means comprises a threaded bolt attaching said positioning wall to said container bay, and wherein said positioning wall is continuously adjustable.

28. The system of deterring bacterial growth in food liquids by rapidly cooling hot bulk food liquids according to claim 26, wherein said adjusting means comprises a notched bolt having at least two notches interactable with said container bay, and wherein said positioning wall is discretely adjustable depending upon which of said notches is interacting with said container bay.

29. The system of rapidly cooling hot bulk liquids according to claim 18, wherein said rotator comprises at least one of a rotator block or rotator recess dimensioned to mate with a corresponding container recess or container projection formed on said container.

30. The system of rapidly cooling hot bulk liquids according to claim 29, said container further comprising a container projection disposed on an upper surface of said container top, said projection facilitating tightening of said top on said housing, wherein said rotator comprises a recess matable with said projection on said top of said container.

31. The system of rapidly cooling hot bulk liquids according to claim 30, said container further comprising a recess formed on an underside of said container housing, said rotator further comprising a block matable with said recess on said container housing.

32. The system of rapidly cooling hot bulk liquids according to claim 31, wherein said container recess is substantially the inverse of said projection atop said top, wherein multiple of said containers can thus be stacked with enhanced stability.

33. The system of rapidly cooling hot bulk liquids according to claim 29, said container further comprising a recess formed on an underside of said container housing, said rotator further comprising a block matable with said recess on said container housing.

34. The system of rapidly cooling hot bulk liquids according to claim 33, further comprising a container tightening station having a projection matingly engageable with said recess on said container adapted to substantially prevent said container housing from moving when a user tightens said container top on said container housing when said container recess is fitted over said container tightening station projection.

35. The system of rapidly cooling hot bulk liquids according to claim 18, said rotator further comprising a lathe chuck for securing said container during rotation.

36. The system of deterring bacterial growth in food liquids by rapidly cooling hot bulk food liquids according to claim 18, wherein said container top comprises an inherent void volume that traps air in contact with the hot bulk food liquid disposed in said container.

37. The system of deterring bacterial growth in food liquids by rapidly cooling hot bulk food liquids according to claim 18, said chilling station further comprising a rotation controller in communication with said rotator adapted to control the rate of rotation of said rotator and thus said container.

38. The system of deterring bacterial growth in food liquids by rapidly cooling hot bulk food liquids according to claim 37, wherein said rotation controller allows a user to vary the rate of rotation of said rotator depending on the size of said container.

39. The system of deterring bacterial growth in food liquids by rapidly cooling hot bulk food liquids according to claim 37, wherein said rotation controller allows a user to vary the rate of rotation of said rotator depending on the viscosity of food liquids contents of said container.

40. The system of deterring bacterial growth in food liquids by rapidly cooling hot bulk food liquids according to claim 39, wherein the higher the viscosity of the food liquids contents of said container, the slower said rotation controller allows said rotator to rotate said container.

* * * * *